United States Patent [19]

Ebert et al.

[11] Patent Number: 5,265,825
[45] Date of Patent: Nov. 30, 1993

[54] HELICOPTER ENGINE CONTROL HAVING YAW INPUT ANTICIPATION

[75] Inventors: Frederick J. Ebert, Westport; Joseph T. Driscoll, Cheshire, both of Conn.; David H. Sweet, Tequesta, Fla.

[73] Assignee: United Technologies Corporation, Hartford, Conn.

[21] Appl. No.: 936,187

[22] Filed: Aug. 26, 1992

Related U.S. Application Data

[63] Continuation-in-part of Ser. No. 750,355, Aug. 27, 1991, abandoned.

[51] Int. Cl.⁵ .................. B64C 11/44; B64C 27/54; G05D 1/08
[52] U.S. Cl. .................. 244/17.13; 244/182; 244/184; 244/195; 364/431.07
[58] Field of Search .......... 244/17.13, 17.19, 17.21, 244/182, 184, 195; 416/30; 364/431.07, 433, 434

[56] References Cited

U.S. PATENT DOCUMENTS

| | | | |
|---|---|---|---|
| 4,488,236 | 12/1984 | Morrison et al. | 244/182 |
| 4,493,465 | 1/1985 | Howlett et al. | 244/17.13 |
| 4,807,129 | 2/1989 | Perks | 244/17.13 |
| 4,912,642 | 3/1990 | Larsen et al. | 244/182 |
| 4,947,334 | 8/1990 | Massey et al. | 364/434 |
| 4,998,202 | 3/1991 | Walsh et al. | 244/182 |

FOREIGN PATENT DOCUMENTS

2144244  2/1985  United Kingdom ............ 244/17.13

Primary Examiner—Michael S. Huppert
Assistant Examiner—Virna Lissi Ansley
Attorney, Agent, or Firm—Michael Grillo

[57] ABSTRACT

A helicopter engine fuel control anticipates sudden changes in engine power demand during yaw inputs to thereby minimize engine and main rotor speed droop and overspeed during yaw maneuvers. The rate (121,123) of yaw control (107) position change generates (110) a yaw component (104) of a helicopter fuel control (52) fuel command signal (70). The magnitude of the yaw component is also dependant upon the rate of yaw control position change (703). The fuel command signal yaw component (104) is overridden (113,115) when rotor decay rate (209,217) has been arrested during a sharp left hover turn (216); when the yaw component is removing fuel (239) during rotor droop (238); and when the yaw component is adding fuel (228) during rotor overspeed (227).

15 Claims, 8 Drawing Sheets

HELICOPTER ENGINE CONTROL HAVING YAW INPUT ANTICIPATION

This application is a continuation-in-part of application Ser. No. 07/750,355, filed Aug. 27, 1991, now abandoned.

TECHNICAL FIELD

This invention relates to helicopter fuel controls, and more particularly to a fuel control which anticipates both increases and decreases in main rotor speed during sudden yaw inputs so as to mitigate main rotor droop and overspeed.

BACKGROUND OF THE INVENTION

In modern helicopters, the trend toward main rotor systems which have lower inertia reduces the amount of stored energy in the rotor system and causes the rotor to be more susceptible to large transient speed excursions during certain flight maneuvers, e.g., during a sudden yaw maneuver changing the heading of the aircraft. Such main rotor speed excursions, working in conjunction with other flight characteristics of helicopters, may result in unbalanced torque causing the nose of the aircraft to deviate from the desired heading. This undesirable deviation in the aircraft heading may cause an increase in pilot workload, frequently at critical times, or saturation of the aircraft stability augmentation system, or both.

Typically, the helicopter main rotor and a tail rotor are driven by a common gear mechanism. The tail rotor primarily functions as a torque compensating device to counteract the torque effect of the main rotor. Secondarily, the tail rotor is a means for controlling the angular movement of the helicopter about its vertical axis, thereby controlling the heading of the helicopter. In newer generation helicopters, a shrouded fan rather than a conventional tail rotor may be used for torque compensation. As used herein, the term "tail rotor" is intended to refer to helicopter anti-torque devices including the conventional type of torque compensation device, i.e., a tail rotor, and the newer generation tail fan devices.

The thrust produced by the tail rotor is dependent upon the pitch angle of the tail rotor blades and, to a certain extent, upon external factors such as ambient wind conditions and main rotor down draft and RPM. Assuming that the main rotor rotates counterclockwise and the tail rotor is a puller type device, e.g., produces thrust to pull the tail in the direction of the thrust, when the tail rotor blades have a positive pitch angle, the tail rotor thrust tends to pull the tail to the right; if the blades have a negative pitch angle, the tail rotor thrust tends to the pull the tail to the left; and if the blades have a zero pitch, the tail rotor produces little or no thrust in either direction.

The pitch angle of the tail rotor blades is determined by the position of a pair of pilot operated anti-torque pedals. Typically, with the right pedal moved forward of a neutral position, the blades either have a negative pitch angle or a small positive pitch angle. The farther forward the right pedal is positioned, the larger the negative pitch angle, the nearer the right pedal is to the neutral position, the more positive the pitch angle. As the left pedal is moved forward of the neutral position, the positive pitch angle increases until it becomes maximum with full forward displacement of the left pedal.

When the positive pitch is increased past a threshold position for a given main rotor loading, tail rotor thrust exceeds the thrust needed to overcome torque effects of the main rotor, thereby causing the helicopter nose to yaw to the left. While this method of directional control is excellent, the power requirement of the tail rotor is taken from the total power available from the engine, thereby reducing the power available to the main rotor.

When the tail rotor blades are in a zero or negative pitch position, the tail rotor thrust is acting in the same direction as the main rotor torque, and the helicopter nose will yaw to the right. In this case, the thrust produced by the tail rotor during the right yaw maneuver is typically less than the thrust produced by the tail rotor to counteract the main rotor torque effect prior to the right yaw maneuver, and any excess power available from the engine will be provided to the main rotor.

During certain yaw maneuvers, undesirable rotor speed excursions may occur. For example, during a rapid left turn (for rotor systems which rotate counterclockwise), the tail rotor blades are rapidly positioned to a high positive pitch position, and the engine must supply additional power to the tail rotor to produce sufficient thrust to cause the aircraft to rotate to the left about the yaw axis. During such rapid left turns, the combined demand for power of the tail rotor and main rotor exceeds the engine's current output, and there is insufficient time for the engine to spool up to meet the increased power demand. The tail rotor increased power demand is taken from the main rotor system, thereby causing the main rotor to droop because of loss of momentum. In addition, because the tail rotor and main rotor are driven by a common gear mechanism, the tail rotor may also experience the effects of the insufficient power, thereby resulting in the nose of the aircraft oscillating with a decaying amplitude around the desired heading.

Similarly, during a rapid right turn, the tail rotor blades are rapidly positioned to a zero or negative pitch position, and the power demand of the tail rotor is suddenly reduced. Therefore, the combined power demand of the main rotor and tail rotor is less than the power currently being produced by the engine. The excess power is delivered to the main rotor system, which may cause the main rotor to overspeed.

The insufficient power to meet the rapid increase in power demand caused by a sudden left yaw input, and the excess power available during a sudden right yaw input, is the result of the sluggishness of the helicopter's automatic fuel compensation system, often coupled with the pilot trying to compensate manually for the situation himself. Hence, a reduction in the accuracy of controlling the heading of the aircraft will result. In aircraft used for military purposes, a further negative effect is the reduced accuracy of aiming weapons. An additional problem associated with the sluggishness of the automatic fuel compensation system is that during recovery from main rotor droop, the automatic fuel compensation system initially will add additional fuel to expedite recovery from rotor droop; however, the system may fail to subtract fuel in sufficient time to prevent the rotor speed from exceeding 100% rated rotor speed during such recovery, therefore resulting in overshoot in the recovery from rotor droop causing the rotor to overspeed.

DISCLOSURE OF THE INVENTION

Objects of the invention include provision of a helicopter engine fuel control which anticipates for sudden changes in engine power demand during yaw inputs to thereby minimize engine and main rotor speed droop and overspeed during yaw maneuvers.

According to the present invention, a helicopter engine fuel control comprises a fuel compensation signal generated in response to changes in the position of pilot operated yaw controls, the magnitude of the fuel compensation signal being proportional to a yaw command rate signal indicative of the rate of change in the relative position of the yaw controls, the fuel compensation signal being summed with a primary fuel governor fuel flow signal to thereby control the fuel supplied to the helicopter's engine.

In accordance with a first embodiment of the present invention, the engine fuel control is inhibited from summing the fuel compensation signal with the primary fuel governor fuel flow signal whenever the rotor decay rate has been arrested during a sharp left hover turn, when the fuel compensation signal is removing fuel during main rotor droop, and when the fuel compensation signal is adding fuel during main rotor overspeed.

In further accord with the first embodiment of the present invention, an additional fuel compensation signal is added to the fuel compensation signal during main rotor droop to minimize main rotor speed overshoot during engine recovery from rotor droop.

In accordance with a second embodiment of the present invention, the engine fuel control is inhibited from summing the fuel compensation signal with the primary fuel governor fuel flow signal during engine operation above rated speed if engine speed is increasing and the fuel compensation signal is adding fuel, or if the primary fuel governor is adequately returning engine speed to its rated speed; and during engine operation below rated speed if the fuel compensation signal is removing fuel.

In further accord with the second embodiment of the present invention, a feedback path is provided for the yaw command rate signal so that both the magnitude and duration of the fuel compensation signal are determined as a function of the rate of change in the relative position of the yaw controls.

In still further accord with the second embodiment of the present invention, the magnitude of the fuel compensation signal is limited, the lower limit being determined as a function of the rate of change in engine speed, a large negative fuel compensation signal being allowed if the engine is accelerating, and a proportionally smaller lower limit being used if engine speed is stable or decreasing.

In further accord with the second embodiment of the present invention, the fuel compensation signal is multiplied by an airspeed adjustment multiple, the magnitude of the multiple being determined as a function of airspeed, the multiple being set equal to zero when the aircraft is resting on its landing gear.

The present invention provides a fuel compensation signal in response to pilot yaw inputs to thereby mitigate the effects of engine and rotor speed droop and overspeed during sudden yaw maneuvers. The signal is generated when the pilot inputs a yaw command at a rate above a certain threshold level so that fuel compensation is started immediately upon receiving the yaw input rather than after the effects of the maneuver cause the primary fuel governor to compensate for changed fuel demand caused by the maneuver. Therefore, the fuel compensation signal anticipates the reaction of the primary fuel governor to the effects of the yaw maneuver, and immediately begins compensating to minimize rotor droop and overspeed.

A first embodiment of the present invention provides for overriding of the fuel compensation signal when certain operating conditions are met. For example, it has been found that no additional compensation is necessary whenever the rotor decay rate has been arrested during a sharp left hover turn. Additionally, the engine fuel control overrides the fuel compensation signal to prevent the removal of fuel during main rotor droop or the addition of fuel during main rotor overspeed. Another feature of the first embodiment of the invention is open loop compensation during main rotor droop for providing an additional fuel compensation signal which subtracts fuel as a function of both rotor droop and the rate of recovery from rotor droop. This additional fuel compensation is provided during main rotor droop to minimize main rotor overspeed upon recovery from rotor droop.

A second embodiment of the present invention also provides for overriding the fuel compensation signal. In the second embodiment, override of the fuel compensation signal is provided during engine overspeed if engine speed is increasing and the fuel compensation signal is adding fuel, or if the primary fuel governor is adequately returning engine speed to its rated speed; and during engine droop if the fuel compensation signal is removing fuel. The override criteria in the second embodiment are dependant exclusively upon engine speed, and therefore can reside within the fuel control and not be dependent on aircraft originated signals such as main rotor speed.

The second embodiment also provides a feedback path for the yaw command rate (pedal rate) signal to thereby allow both the magnitude and the duration of the fuel compensation signal to be dependant upon the commanded yaw rate. Therefore, if there is a large commanded yaw rate of a short duration, the feedback path "stretches out" the fuel compensation signal for a period longer than would have occurred based on the yaw command rate signal without feedback. Additionally, the magnitude of the fuel compensation signal is limited, the lower limit being determined as a function of the rate of change in engine speed (NFDF). If engine speed is increasing, a large negative fuel compensation signal is allowed, and if engine speed is stable or decreasing, a proportionally smaller lower limit is used. This prevents excessive rotor and engine droop from a steady engine speed condition caused by too large of a lower limit, and excess rotor and engine overspeed from an initial overspeed condition caused by too small of a lower limit.

It has been found that fuel compensation is not required at high airspeeds, i.e., above 130 KTS, since the aircraft vertical surfaces provide most of the required yaw axis aerodynamic stability and compensation and since snap turns are prohibited by aircraft sideslip and structural limitations at these high speeds. At lower speeds, the amount of compensation required varies as a function of airspeed. Therefore, the second embodiment of the present invention provides an airspeed adjustment multiple, the magnitude of the multiple being determined as a function of airspeed. An additional feature of the multiple is that it is set equal to zero when the aircraft is resting on its landing gear or taxing on the ground, thereby preventing fuel compensation when the aircraft is not airborne.

The invention may be implemented in a variety of ways including analog, digital or computer controls and in a fashion, or with additional features incorporated therewith to provide a more sophisticated control. The invention is easily implemented utilizing apparatus and techniques which are well known within the skill of the art, in light of the specific teachings with respect thereto which follow hereinafter.

Other objects, features and advantages of the present invention will become more apparent in light of the following detailed description of exemplary embodiments thereof, as illustrated in the accompany drawings.

BEST MODE FOR CARRYING OUT THE INVENTION

Figure 1:
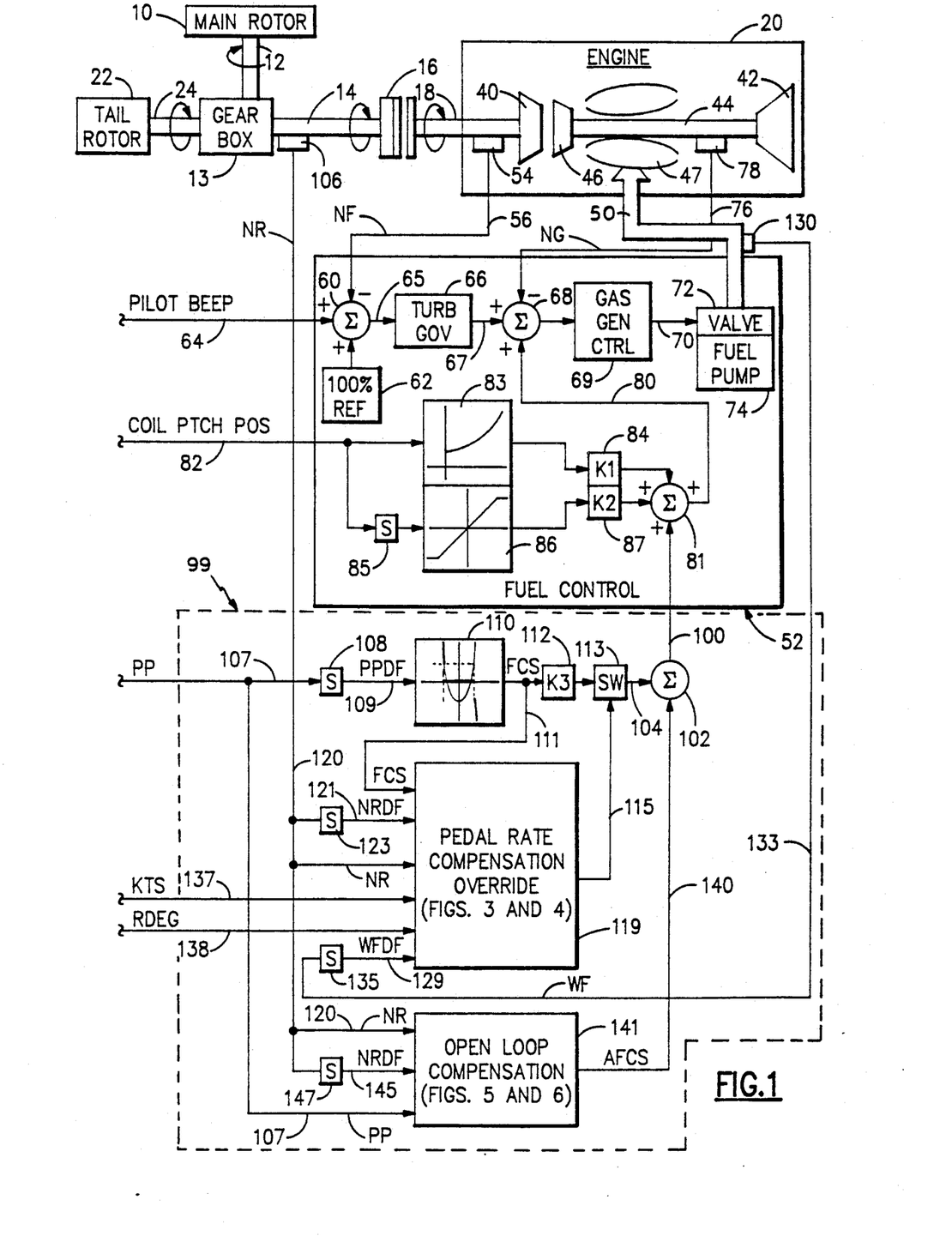
FIG. 1 is a simplified schematic block diagram of a first embodiment of a helicopter rotor drive system in which the engine fuel control is responsive to yaw inputs in accordance with the present invention.

The helicopter engine fuel control of the present invention is particularly well suited for anticipating sudden changes in engine power demand during yaw inputs, thereby alleviating engine and main rotor speed droop and overspeed. Referring to FIG. 1, a main rotor 10 is connected through a shaft 12 to a gearbox 13 which is driven by a shaft 14 through an overrunning clutch 16, which engages an output shaft 18 of an engine 20 when the engine speed equals or exceeds the rotor speed. The gearbox 13 also drives a tail rotor 22 through a shaft 24 so that the main rotor 10 and the tail rotor 22 are always driven at speeds bearing a fixed relationship to each other, such as the tail rotor rotating about five times faster than the main rotor.

The engine 20 may typically comprise a free turbine engine in which the output shaft 18 is driven by a free turbine 40, which in turn is driven by gases from a gas generator including a turbo compressor having a compressor 42 connected by a shaft 44 to a compressor driven turbine 46, and a burner section 47 to which fuel is applied by fuel lines 50 from an automatic fuel control 52 (primary fuel governor).

The fuel control 52 typically tries to provide the correct rates of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60. Although the terms engine, free turbine and free turbine speed (NF) are used herein to describe the present invention, the terms power turbine and power turbine speed (NP) are also frequently used in the art, and could be used interchangeably herein when referring to the free turbine or engine.

The other inputs to the summing junction 60 comprise a reference speed signal (NFREF), which typically is a reference value indicative of 100% rated speed derived from a source 62, together with any pilot desired variant therein as determined by a signal from the pilot's engine speed beeper on a line 64. The output of the summing junction 60 is an engine speed error signal on a line 65 which is applied to a turbine governor portion 66 of the fuel control. The output of the turbine governor 66 is a required gas generator speed signal on a line 67, which is fed to a summing junction 68 at the input of a gas generator control portion 69 of the fuel control. The gas generator control 69 provides a commanded fuel rate (fuel command signal) on a line 70 which is applied to a metering valve 72 so as to cause the correct amount of fuel from a fuel pump 74 to be applied to the fuel inlet lines 50, all in a way well known in the art.

The summing junction 68 is also responsive to a signal indicative of gas generator speed (NG) on a line 76 which may be taken from a tachometer 78 responsive to the gas generator spool including the compressor 42, the shaft 44 and the turbine 46. Another input to the summing junction 68 is a collective pitch input provided on a line 80 from a summing junction 81.

A signal on the line 82 indicative of main rotor collective pitch position (which may be a signal indicative of an angle of a collective pitch stick, representative of a given percent of full collective pitch authority) is provided both proportional and derivative paths. The proportional path includes a function generator or schedule circuit 83 together with an amplifier 84 having a gain K1. The derivative path includes a differentiator 85, a limiter 86 and an amplifier 87 having a gain K2. The outputs of the amplifiers 84, 87 are applied to the summing junction 81. As collective pitch is changed, the derivative path 85–87 provides inputs to increase or decrease the normal turbine governor demand on the gas generator. Similarly, for collective pitch in excess of a predetermined threshold magnitude, the proportional path 83, 84 will provide steady state inputs to the fuel control.

All of the apparatus described thus far is simply exemplary of that which is well known to the art.

In accordance with a first embodiment of the present invention, a yaw input anticipation portion 99 of the engine fuel control provides a compensation signal to the summing junction 81 on a signal line 100. The compensation signal is indicative of a fuel compensation signal (FCS) generated in response to certain yaw commands and an additional fuel compensation signal (AFC) which provides additional compensation during rotor droop. The compensation signal on the line 100 is provided from a summing junction 102.

A first input to the summing junction 102 is provided on a line 104 and is indicative of the fuel compensation signal generated in response to the rate of change of a yaw command input. A yaw command signal (PP), e.g., a signal indicative of the relative positions of pilot operated anti-torque pedals, is provided on a line 107 and is applied to a differentiator 108 so as to provide a yaw command rate signal (PPDF) on a line 109 indicative of the rate of change of the yaw command signal. PPDF is in turn applied to a function generator or schedule 110 that provides a corresponding output fuel compensation signal.

Figure 2:
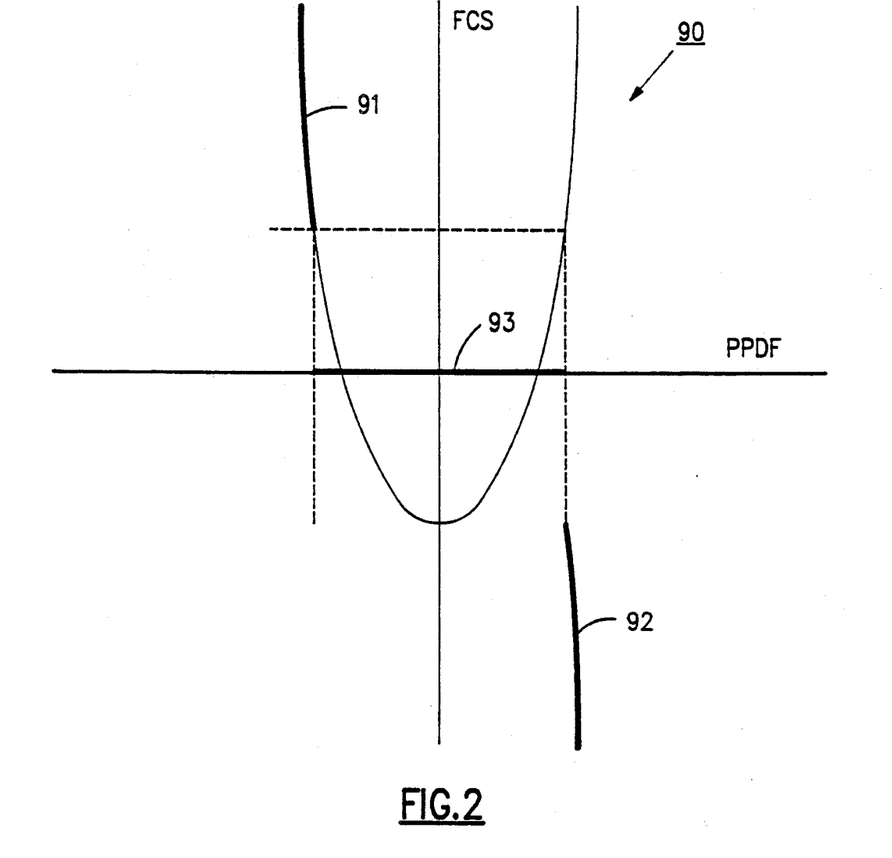
FIG. 2 is an illustration of an exemplary desired fuel compensation signal characteristic employed by a function generator of FIG. 1.

An exemplary desired characteristic 90 of the function generator 110 is illustrated in greater detail in FIG. 2. For example, the function generator 110 provides a fuel compensation signal for increasing the fuel flow 91 during rapid left yaw inputs above a threshold level. Similarly, the function generator provides a fuel compensation signal for decreasing fuel flow 92 during a rapid right yaw input above a threshold level. The threshold levels provide a deadband region 93 in which there is no fuel compensation because during a small yaw maneuver the compensation provided by the automatic fuel control 52 is sufficient to prevent rotor speed excursions. In the exemplary embodiment of the invention, the fuel compensation provided by the function generator 110 is in the form of quadratic compensation to thereby provide smoother response to yaw inputs. Additionally, the shape of the threshold or deadband region 93 may be selected based on the response rate of the automatic fuel control.

Returning to FIG. 1, the output of the function generator 110 is provided on a line 111 via an amplifier 112 having a gain K3 to a switch 113, which in turn applies the amplified fuel compensation signal over the line 104 to the summing junction 102. The switch 113 may comprise a field effect transistor (FET) or other suitable transistor switch as is known in the art. The signal on the line 104 is provided through the switch 113 unless there is a signal on a line 115 to activate the switch to an open position.

The signal on the line 115 is provided by a pedal rate compensation override logic portion 119 of the engine fuel control when certain conditions are met as described in greater detail hereinafter with respect to FIGS. 3 and 4. The logic portion 119 is responsive to signals on lines 120 and 121, respectively indicative of rotor speed (NR), as determined from a tachometer 106 which may be responsive to the speed of the shaft 14 at the input to the gearbox 13, and the rate of change of rotor speed (NRDF), as determined by applying rotor speed on the line 120 to a differentiator 123 thereby providing a signal indicative of the rate of change of rotor speed on the line 121. The logic portion 119 is also responsive to the fuel compensation signal on the line from the output of the schedule 110, and the rate of change of fuel flow (WFDF) provided on the line 129, as determined by a flow meter 130 or other method of measuring fuel flow (WF), e.g., the position of the fuel valve 72, supplied on a line 133 to a differentiator 135 so as to provide a signal indicative of the rate of change of fuel flow. Finally, the logic portion 119 is also responsive to signals on lines 137 and 138, respectively indicative of helicopter speed (KTS) and the rate of change of helicopter heading during a left hover turn, both being provided by aircraft mounted sensors.

Figure 3:
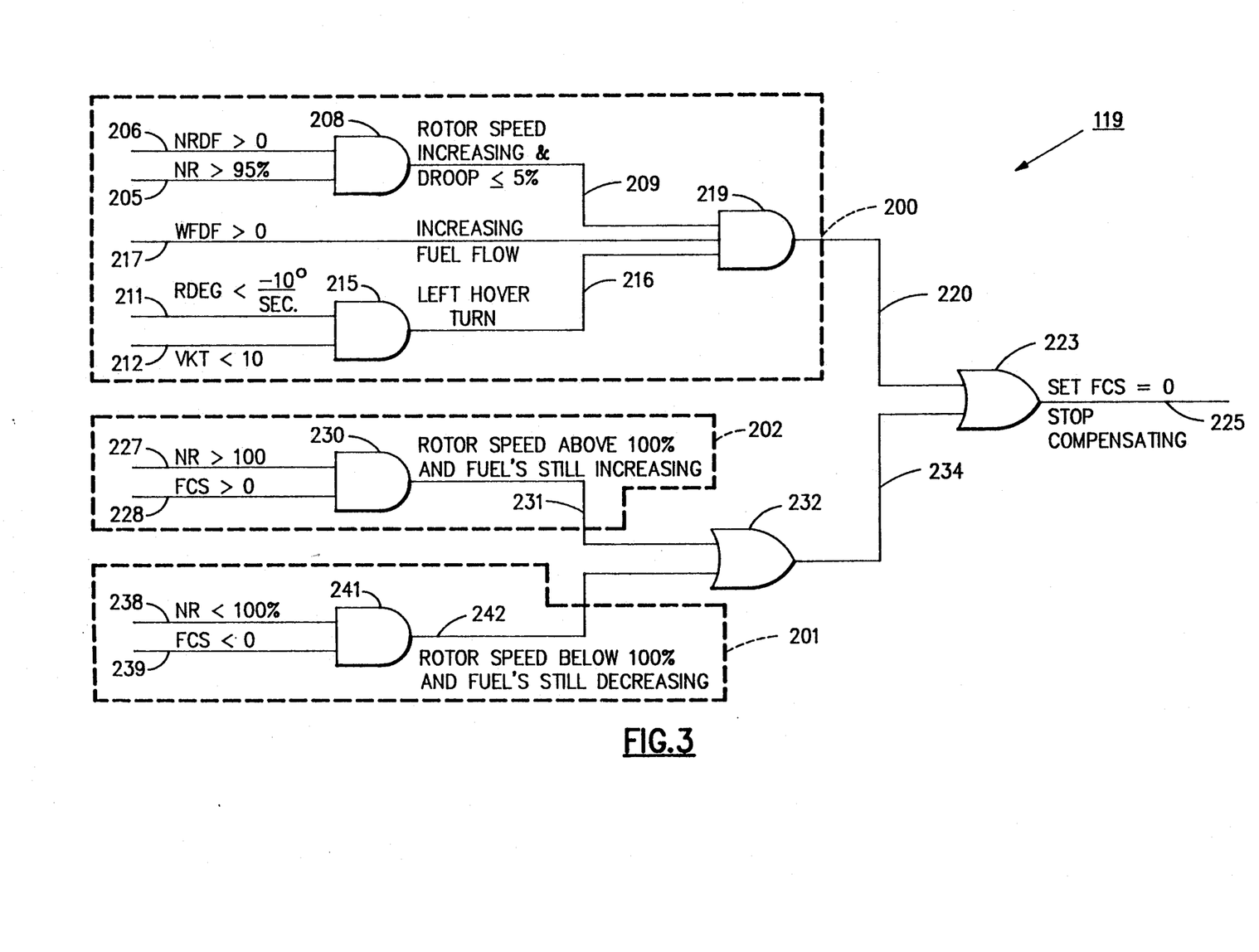
FIG. 3 is a simplified logic flow diagram for determining when to stop fuel compensation in accordance with the embodiment of FIG. 1.

Referring now to FIG. 3, the pedal rate compensation override logic portion 119 contains three logic expressions which correspond to three different conditions in which the fuel compensation signal is overridden: when the rotor decay rate has been arrested during a sharp left hover turn 200; when the fuel compensation signal is removing fuel during main rotor droop 201; and when the fuel compensation signal is adding fuel during main rotor overspeed 202. Five conditions are monitored to determine whether the fuel compensation signal should be overridden during a sharp left hover turn. If NR is greater than a nominal threshold of rated speed, e.g., 95% of rated speed, and NRDF is greater than 0, i.e., NR is increasing, a logic one is provided on signal lines 205 and 206 respectively, resulting in an output of logic one from AND gate 208 on signal line 209. Similarly, if the helicopter is turning left at a rate of less than 10° per second and the horizontal speed of the helicopter is less than 10 knots, a logic one is provided on signal lines 211 and 212 respectively, resulting in an output of logic one from AND gate 215 on signal line 216. Finally, if WFDF is greater than zero, i.e., WF is increasing, a logic one is provided on signal line 217. Therefore, if a logic one is present on the signal lines 209, 216 and 217, the output of AND gate 219 is a logic one on signal line 220, resulting in an output of logic one from OR gate 223 on signal line 225, and the fuel compensation signal is overridden.

If main rotor speed is greater than 100% of rated speed and the fuel compensation signal is adding fuel, a logic one is provided on signal lines 227 and 228 respectively, resulting in an output of logic one from AND gate 230 which is provided on signal line 231 to OR gate 232, which in turn provides a logic one on signal line 234 to the OR gate 223, and the fuel compensation signal is overridden. Similarly, if main rotor speed is less than 100% of rated speed and the fuel compensation signal is removing fuel, a logic one is provided on signal lines 238 and 239 respectively, resulting in an output of logic one from AND gate 241 which is provided on signal line 242 to the OR gate 232 and ultimately to the OR gate 223, and the fuel compensation signal is overridden.

Figure 4:
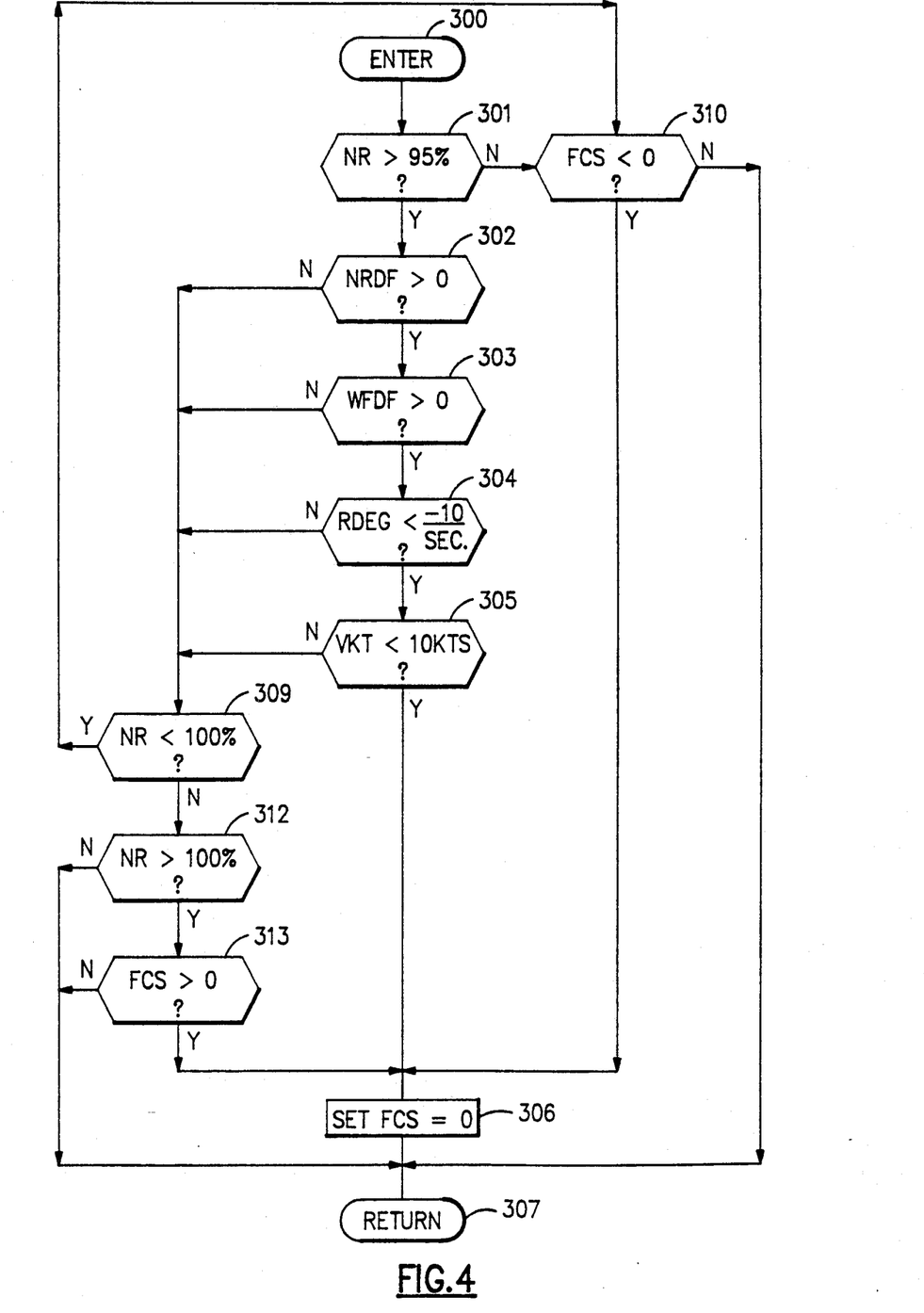
FIG. 4 is a logic flowchart illustrative of a routine for determining when to stop fuel compensation in accordance with FIG. 3.

Although the pedal rate compensation override logic portion 119 of the engine fuel control is illustrated in terms of digital logic gates in FIG. 3, it may be implemented very easily with a simple computer program of the type illustrated in FIG. 4 herein, such routine being performable digitally by means of a microprocessor (UPROC), or it may be incorporated as a simple program change within a digital, computerized automatic flight control system.

Referring to FIG. 4, the program is entered in a step 300, and the UPROC checks if NR is greater than 95% of rated speed in a test 301. If the results of the test 301 are positive, the UPROC checks if NRDF is greater than zero in a test 302. If the results of the test 302 are positive, the UPROC checks if WFDF is greater than zero in a test 303. If the results of the test 303 are positive, the UPROC checks if the helicopter is in a left hover turn in the tests 304 and 305. If the results of the tests 304 and 305 are positive, the helicopter is in a sharp left hover turn in which the rotor decay rate has been arrested, and step 306 is performed wherein the fuel compensation signal is set equal to zero. The subroutine then returns in a step 307.

If the results of any of the test 302, 303, 304 or 305 are negative, the subroutine reaches a test 309 in which the UPROC checks if rotor speed is less than 100% of rated speed. If the results of the test 309 are positive, the subroutine checks if the fuel compensation signal is removing fuel in a test 310. The subroutine also reaches the test 310 if the results of the initial test 301 are negative. If the results of the test 310 are positive, rotor speed is less than 100% of rated speed and fuel is still decreasing, and the step 306 is performed wherein the fuel compensation signal is set equal to zero. The subroutine then returns in the step 307. If the results of the test 310 are negative, the subroutine returns in the step 307.

If the results of the test 309 are negative, the UPROC checks if rotor speed is greater than 100% of rated speed in a test 312. If the results of the test 312 are negative, the subroutine returns in the step 307. However, if the results of the test 312 are positive, the UPROC checks if the fuel compensating signal is adding fuel in a test 313. If the results of the test 313 are positive, rotor speed is greater than 100% of rated speed and fuel is still increasing, and the step 306 is performed wherein the fuel compensation signal is set equal to zero. The subroutine then returns in the step 307. If the results of the test 313 are negative, the subroutine returns in the step 307.

Referring again to FIG. 1, an additional fuel compensation signal (AFC) is provided to the summing junction 102 on a signal line 140 which provides additional fuel compensation during certain instances when the aircraft is experiencing rotor droop to minimize main rotor overspeed upon recovery from rotor droop. The signal on the line 140 is provided by an open loop compensation portion 141 of the engine fuel control described in greater detail hereinafter with respect to FIGS. 5 and 6. The open loop compensation portion 141 is responsive to signals on line 120 indicative of NR and on line 145 indicative of NRDF as determined by the rotor speed signal on the line 120 applied to a differentiator 147 so as to provide a signal indicative of the rate of change of rotor speed on the line 145. The open loop compensation portion is also responsive to the yaw input command signal on the line 107.

Figure 5:
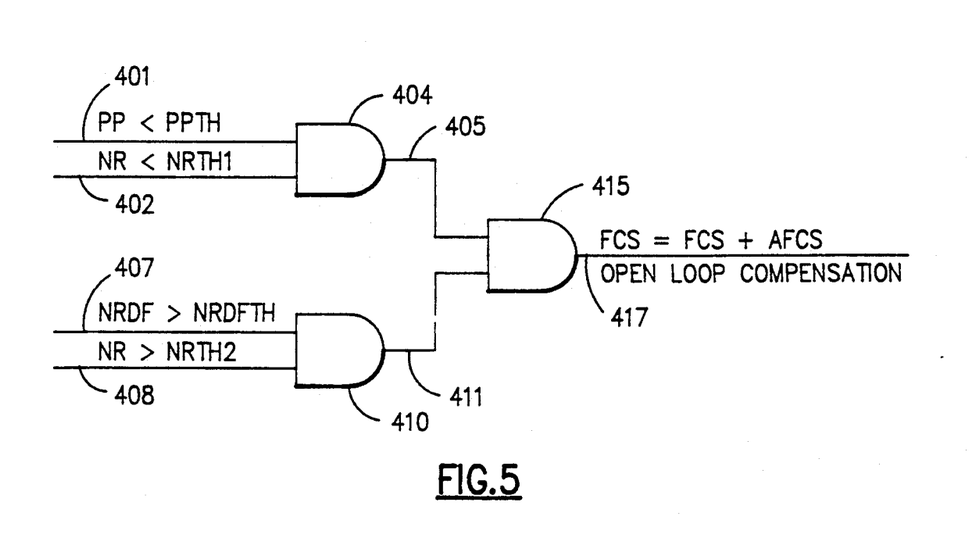
FIG. 5 is a simplified logic diagram for determining when to implement open loop compensation during engine recovery from rotor droop in accordance with the embodiment of FIG. 1.

The additional fuel compensation signal provided by the open loop compensation portion 141 subtracts fuel as a function of rotor droop and the rate of recovery from rotor droop so as to minimize main rotor overspeed upon recovery from rotor droop. Referring to FIG. 5, four conditions are monitored to determine whether the addition fuel compensation signal should be added to the fuel compensation signal during rotor droop. If PP is less than a yaw input command threshold level (PPTH) and if NR is less than a first rotor speed threshold level (NRTH1), a logic one is provided on signal lines 401 and 402 respectively, resulting in an output of logic one from AND gate 404 on signal line 405. Similarly, if NRDF is greater than a NRDF threshold level (NRDFTH) and if NR is greater than a second rotor speed threshold level (NRTH2), a logic one is provided on signal lines 407 and 408 respectively, resulting in an output of logic one from AND gate 410 on signal line 411. Therefore, if a logic one is present on the signal lines 405 and 411, the output of AND gate 415 is a logic one on signal line 417, and additional fuel compensation is provided to minimize main rotor overspeed upon recovery from rotor droop.

Figure 6:
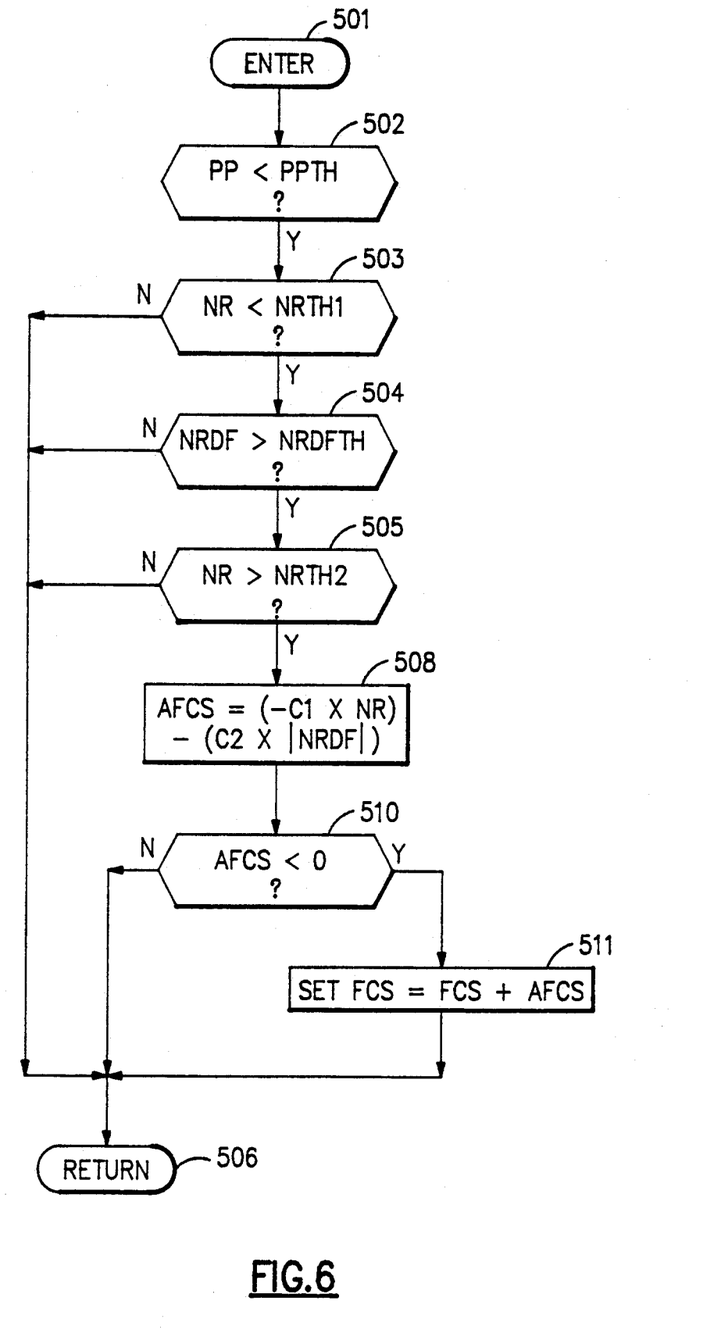
FIG. 6 is a logic flowchart illustrative of a routine for implementing open loop compensation in accordance with FIG. 5.

The open loop compensation of the present invention may be implemented with a simple computer program of the type illustrated in FIG. 6 herein, such routine being performable digitally by means of a microprocessor (UPROC). Referring to FIG. 6, the subroutine is entered in a step 501, and then the UPROC checks in a series of test 502, 503, 504 and 505 if the conditions for open loop compensation are met as described herein with respect to FIG. 5. If the results of any one of the tests 502, 503, 504 or 505 are negative, the conditions for open loop compensation are not met, and the subroutine returns in a step 506. However, if the results of every one of the tests 502, 503, 504 and 505 are positive, step 508 is performed wherein AFC is calculated as a function of both NR multiplied by a first constant C1 and the absolute value of NRDF multiplied by a second constant C2. The UPROC then checks if AFC is less than zero, i.e., removing fuel, in a test 510. If the results of the test 510 are negative, AFC is adding fuel, which will contribute to main rotor overshoot, and therefore the subroutine returns in the step 506. However, if the results of the test 510 are positive, step 511 is performed wherein AFC it is added to FCS. The subroutine then returns in the step 506. Therefore, AFC is only added to FCS when it subtracts fuel during recovery from rotor droop so as to minimize overshoot.

It will be noted that the pedal rate compensation override of FIGS. 3 and 4 sets FCS equal to zero during rotor droop if FCS is removing fuel; however, AFC is added to FCS after the override, and therefore, the amount of fuel removed during rotor droop is limited to a maximum value equal to AFC. The value of AFC is generally small in comparison to the primary fuel governor commanded fuel rate and is determined so as to allow rapid recovery from rotor droop while minimizing the amount of overshoot. Although AFC is illustrated as being calculated based on NR and NRDF, more sophisticated methods of determining open loop compensation may be employed such as basing the amount of open loop compensation on NR, NRDF, and the rate of change of NRDF, i.e., the derivative of NRDF. Such a regime would further minimize the amount of overshoot during recovery from main rotor droop.

Figure 7:
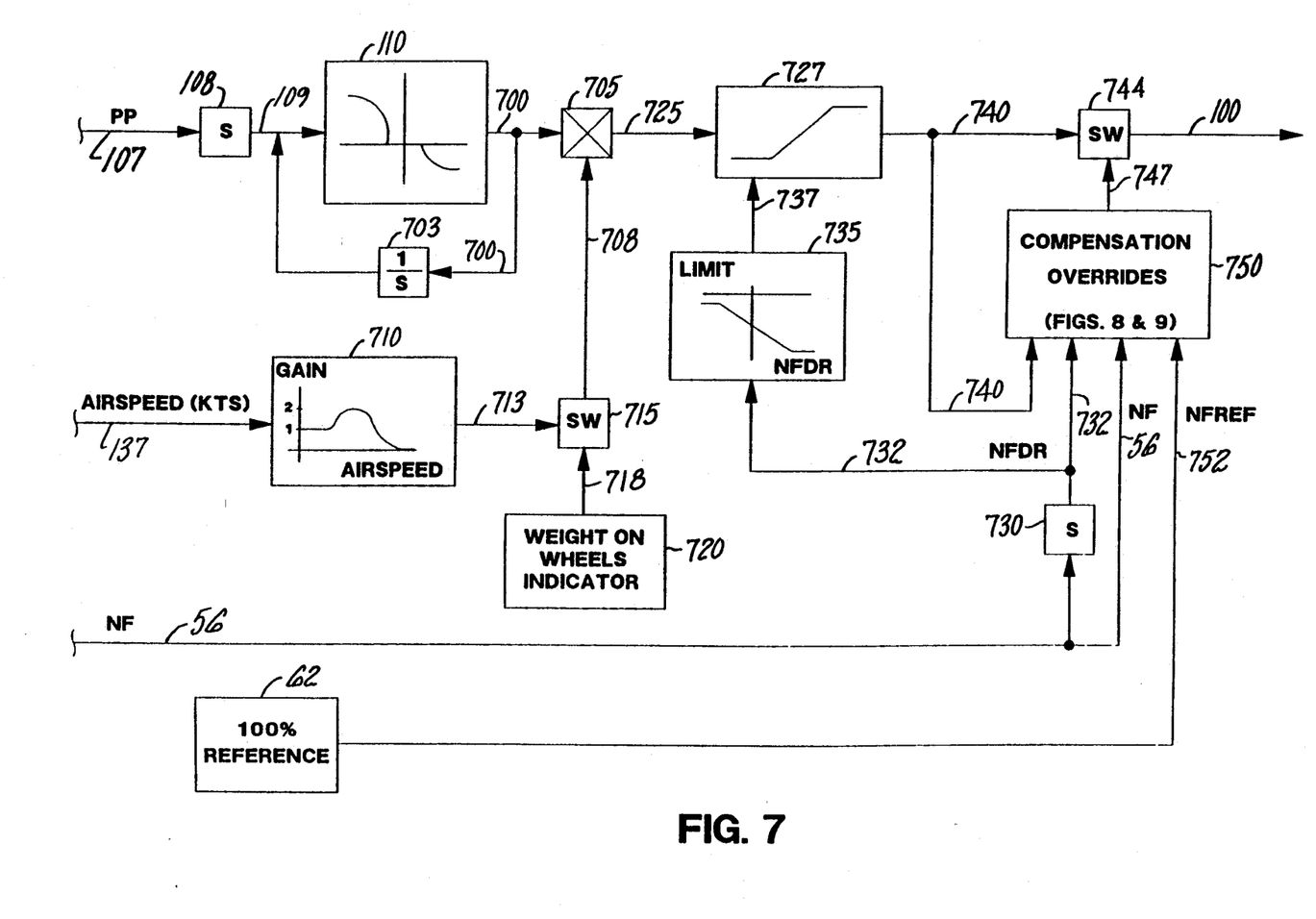
FIG. 7 is a simplified schematic block diagram of a second embodiment of a helicopter rotor drive system in which the engine fuel control is responsive to yaw inputs in accordance with the present invention.

A second embodiment of the yaw input anticipation portion 99 of the engine fuel control is shown in FIG. 7. The yaw command signal (PP), is provided on the line 107 to the differentiator 108 so as to provide the yaw command rate signal (PPDF) on the line 109. PPDF is in turn applied to the function generator 110 to thereby provide a corresponding output fuel compensation signal on a line 700. The output of the function generator 110 is fed back to the input of the function generator via an integrator 703. Yaw command signals that are of a large magnitude and rapidly applied may place a significant load on the engine, thereby providing the potential for large rotor droop or overspeed and the need for yaw input anticipation. When the yaw axis command is of a short duration, the feedback gain is used to "stretch out" the fuel compensation signal for a period longer than would have occurred based on the output of the function generator 110 without feedback. The second embodiment of the invention therefore provides fuel compensation the magnitude and duration of which is dependant upon the yaw command rate signal.

The fuel compensation signal is provided on the line 700 to a multiplication function 705 which multiplies the fuel compensation signal by an airspeed multiple on a line 708. The airspeed multiple is provided by an airspeed adjustment function 710 which is responsive to air speed on the line 137 for providing the multiple on a line 713. It has been found that fuel compensation is not required at high airspeeds, i.e., above 130 KTS, since the aircraft vertical surfaces provide most of the required yaw axis aerodynamic stability and compensation and since snap turns are prohibited by aircraft sideslip and structural limitations at these high speeds. At lower speeds, the amount of compensation required varies as a function of airspeed. Therefore, the magnitude of the airspeed adjustment multiple is determined as a function of airspeed. The multiple is provided from the line 713 to the line 708 via a switch 715, e.g., a transistor switch. The switch is responsive to a weight on wheels signal on a line 718 provided by a weight on wheels indicator 720. When the aircraft is resting on its landing gear, a signal is provided on the line 718 to open the switch, so that that the magnitude of the multiple on the line 708 is zero. Therefore, when the aircraft is resting on its landing gear, no fuel compensation is provided. When the aircraft is airborne, the output of the weight on wheel indicator is zero, and the switch is closed, thereby connecting the line 713 with the line 708.

The output of the multiplication function 705 is provided on a line 725 to a limiter 727. The limiter 727 limits the magnitude of the fuel compensation signal. The upper limit of the limiter is fixed; however, the lower limit of the limiter is determined as a function of the rate of change in engine speed (NFDF). If engine speed is increasing, a large negative fuel compensation signal is allowed, and if engine speed is stable or decreasing, a proportionally smaller lower limit is used. This prevents excessive rotor and engine droop from a steady engine speed condition caused by too large of a lower limit, and excess rotor and engine overspeed from an initial overspeed condition caused by too small of a lower limit. The engine speed signal (NF) is provided on the line 56 to a differentiator 730, the output of which is NFDF on a line 732. A limit function 735 is responsive to NFDF for providing the limiter 727 lower limit on a line 737.

The output of the limiter, i.e., the magnitude limited fuel compensation signal, is provided on a line 740 to a switch 744, e.g., a transistor switch. The fuel compensation signal on the line 740 is provided through the switch 744 to the line 100 unless there is a signal on a line 747 to activate the switch to an open position. The signal on the line 747 is provided by compensation override logic 750 of the engine fuel control when certain conditions are met as described in greater detail hereinafter with respect to FIGS. 8 and 9. The logic 750 is responsive to the engine speed signal (NF) on the line 56, NFDF on the line 732 and the fuel compensation signal on the line 740. The logic 750 is also responsive to the engine speed reference signal (NFREF) on a line 752 indicative of 100% of engine rated speed as provided by the engine speed reference function 62.

Figure 8:
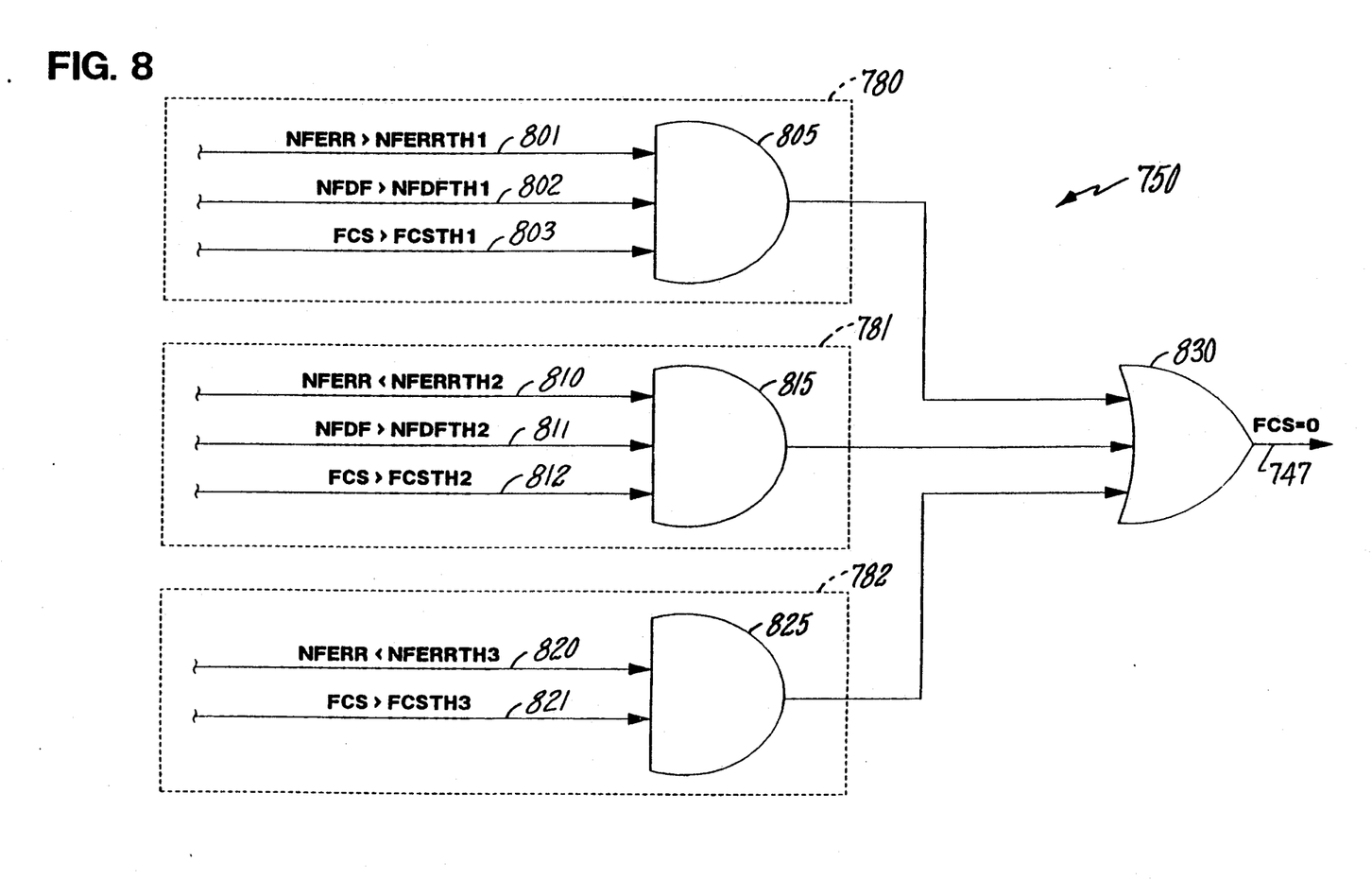
FIG. 8 is a simplified logic flow diagram for determining when to stop fuel compensation in accordance with the embodiment of FIG. 7.

Referring to FIG. 8, the compensation override logic 750 contains three logic expressions which correspond to three different conditions in which the fuel compensation signal is overridden: during engine overspeed if engine speed is increasing and the fuel compensation signal is adding fuel 780; during engine overspeed if the primary fuel governor is adequately returning engine speed to its rated speed 781; and during engine droop if the fuel compensation signal is removing fuel 782. The override criteria in the second embodiment are dependant exclusively upon engine speed, and therefore can reside within the fuel control and not be dependent on aircraft originated signals such as main rotor speed. The difference between engine speed and engine reference speed is referred to as engine speed error (NFERR). If engine speed is greater than engine reference speed, than NFERR indicates that the engine is in an overspeed condition. If engine speed is less than engine reference speed, then NFERR indicates that the engine is in an under speed or droop condition.

If NFERR is greater than a first overspeed threshold (NFERRTH1), NFDF is greater than a positive rate of change threshold (NFDFTH1) and FCS is greater than a first fuel compensation signal positive threshold (FCSTH1), a logic one is provided on signal lines 801, 802 and 803 respectively to a first AND gate 805. Similarly, if NFERR is less than a second overspeed threshold (NFERRTH2), NFDF is greater than a negative rate of change threshold (NFDFTH2) and FCS is greater than a second fuel compensation signal positive threshold (FCSTH2), a logic one is provided on signal lines 810, 811 and 812 respectively to a second AND gate 815. Finally, if NFERR is less than a droop threshold (NFERRTH3) and FCS is greater than a fuel compensation signal negative threshold (FCSTH3), a logic one is provided on signal lines 820 and 821 respectively to a third AND gate 825. If the output of any one of the AND gates is a logic one, the conditions for overriding the fuel compensation signal are met, and a signal is provided on the line 747 by OR gate 830 for activating the switch 744 (FIG. 7) to the open position.

Figure 9:
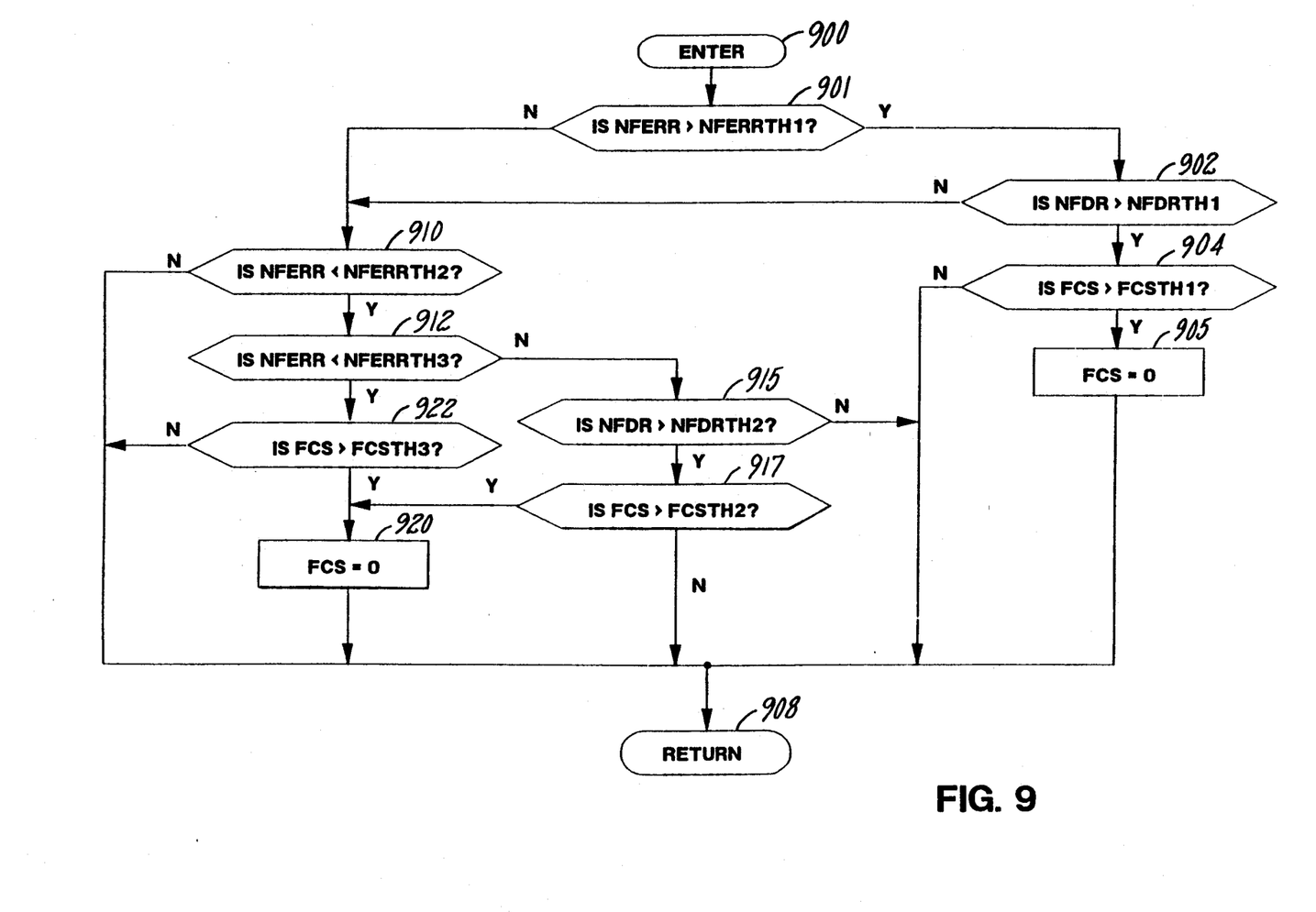
FIG. 9 is a logic flowchart illustrative of a routine for determining when to stop fuel compensation in accordance with FIG. 8.

Although the compensation override logic 750 of the engine fuel control of FIG. 7 is illustrated in terms of digital logic gates in FIG. 8, it may be implemented very easily with a simple computer program of the type illustrated in FIG. 9 herein, such routine being performable digitally by means of a microprocessor (UPROC), or it may be incorporated as a simple program change within a digital, computerized automatic flight control system.

Referring to FIG. 9, the program is entered in a step 900, and the UPROC checks if NFERR is greater than NFERRTH1 in a test 901. If the results of the test 901 are positive, engine speed is greater than the first overspeed threshold, and a test 902 is performed wherein the UPROC checks if NFDF is greater than NFDFTH1. If the results of the test 902 are positive, engine speed is increasing above the positive rate of change threshold magnitude, and a test 904 is performed wherein the UPROC checks if FCS is greater than FCSTH1. If the results of the test 904 are positive, the fuel compensation signal is above a compensation threshold, and a step 905 is performed wherein the fuel compensation signal is set equal to zero. The subroutine then returns in a step 908. If the results of the test 904 are negative, the conditions for overriding the fuel compensation signal are not met and the subroutine returns in the step 908.

If the results of either the test 901 or the test 902 are negative, the subroutine reaches a test 910 wherein the UPROC checks if NFERR is less than NFERRTH2. If the results of the test 910 are negative, the conditions for overriding the fuel compensation signal are not met and the subroutine returns in the step 908. However, if the results of the test 910 are positive, a test 912 is performed wherein the UPROC checks if NFERR is less than NFERRTH3. If the results of the test 912 are negative, NFERR is between the second overspeed threshold and the droop threshold, and a test 915 is performed wherein the UPROC checks if NFDF is greater than NFDFTH2. If the results of the test 915 are positive, the engine speed is returning to rated speed, and a test 917 is performed wherein the UPROC checks if FCS is greater than FCSTH2. If the results of the test 917 are positive, the fuel compensation signal is above a compensation threshold, and a step 920 is performed wherein the fuel compensation signal is set equal to zero. The subroutine then returns in the step 908. If the results of the tests 916 or 917 are negative, the conditions for overriding the fuel compensation signal are not met and the subroutine returns in the step 908.

If the results of the test 912 are positive, engine speed is below the droop threshold, and a test 922 is performed wherein the UPROC checks if FCS is greater than FCSTH3. If the results of the test 922 are positive, the fuel compensation signal is above a compensation threshold, and the step 920 is performed wherein the fuel compensation signal is set equal to zero. The subroutine then returns in the step 908. If the results of the test 922 are negative, the conditions for overriding the fuel compensation signal are not met and the subroutine returns in the step 908.

Although not shown, the speed, collective input and yaw input signals are preferably filtered in a suitable known way; and the derivatives (circuits 85, 108, 123, 135, 147 and 730) may have a low pass filter to reduce noise associated therewith. Although the invention is shown as being an add-on to an existing fuel control, it may be incorporated directly within the fuel control.

Although the yaw input compensation is generally shown in terms of analog function blocks, the invention may be implemented with a computer program change to the program of a fuel control which is implemented digitally by means of a computer, or it may be incorporated as a program change within a digital, computerized automatic flight control system if desired. The invention could be implemented with dedicated digital or analog hardware.

The invention is described as being utilized with the fuel control of a free turbine gas engine. However, it may also be utilized with other types of engines, in an appropriate fashion which should be readily apparent to those skilled in the art in light of the description hereinbefore. Also, the yaw input command signal can be based on the rate at which the tail rotor pitch servo is commanded, as well as the rate at which the pilot operated controls are repositioned as described in the exemplary embodiment herein, or the yaw input command signal can be a weighted sum of such signals as required to achieve a desired fuel compensation as determined by the anticipated helicopter operational environment. The pilot operated yaw controls are described as pedal controls operated by the pilot's feet; however, it will be understood that any method of controlling a parameter, e.g., a movable stick, twist grip, switch, dial, etc., may be used to input yaw commands in accordance with the present invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention.

We claim:

1. A helicopter comprising:
 a main rotor;
 a tail rotor having a plurality of blades;
 an engine
 rotor drive means including an overrunning clutch for connecting said main rotor to said engine whenever the speed of said main rotor does not exceed the speed of said engine;
 pilot operated yaw controls for providing a yaw command signal indicative of the relative position of said pilot operated yaw controls, said yaw command signal controlling the pitch angle of said tail rotor blades; and
 engine control means for providing a fuel command signal indicative of fuel flow required for desired engine operation, and for metering fuel flow to said engine in response to said fuel command signal;
 characterized by,
 means for providing a yaw command rate signal indicative of the rate of change of said yaw command signal; and
 said engine control means comprising means for providing said fuel command signal with a yaw component in response to said yaw command rate signal.

2. A helicopter according to claim 1, further characterized by said fuel command signal yaw component increasing fuel flow to said engine in response to a commanded yaw maneuver in the direction of main rotor rotation and said yaw input rate signal being in excess of a first predetermined threshold rate, and said fuel command signal yaw component decreasing fuel flow to said engine in response to a commanded yaw maneuver opposite the direction of main rotor rotation and said yaw input rate signal being in excess of a second predetermined threshold rate.

3. A helicopter according to claim 2 wherein said engine control means further comprises means for providing an override signal for overriding said fuel command signal yaw component.

4. A helicopter according to claim 3 further comprising:
 rotor speed means for providing a rotor speed signal indicative of the rotary speed of said rotor; and
 said override signal being provided in response to said rotor speed signal being in excess of a first rotor speed threshold and said fuel command signal yaw component increasing fuel flow to said engine, or said rotor speed signal being below said first rotor speed threshold and said fuel command signal yaw component decreasing fuel flow to said engine.

5. A helicopter according to claim 4 further comprising:
 rotor acceleration means for providing a rotor acceleration signal indicative of the positive or negative acceleration of said rotor;
 helicopter speed means for providing a helicopter speed signal indicative of the speed of the helicopter;
 means for providing a helicopter turn signal indicative of the rate that the helicopter is turning;
 fuel rate means for providing a fuel rate signal indicative of the rate that fuel is being supplied to said engine; and
 said override signal being further provided in response to said rotor acceleration signal being indicative of positive acceleration, said rotor speed signal being in excess of a second rotor speed threshold, said fuel rate signal being in excess of a fuel threshold rate, said helicopter speed being below a helicopter threshold speed and said turn signal being below a turn threshold rate.

6. A helicopter according to claim 1 wherein said engine control means further comprises:
rotor speed means for providing a rotor speed signal indicative of the rotary speed of said rotor;
rotor acceleration means for providing a rotor acceleration signal indicative of the positive or negative acceleration of said rotor; and
means for providing said fuel command signal with a rotor droop component which decreases fuel flow to said engine when said rotor speed signal is below a third rotor speed threshold and said rotor acceleration signal is indicative of positive acceleration and in excess of a threshold acceleration, to thereby limit said rotor speed signal exceeding said third rotor speed threshold.

7. A helicopter according to claim 6 wherein said fuel command signal rotor droop component is a function of said rotor speed signal and said rotor acceleration signal.

8. A helicopter comprising:
a main rotor;
a tail rotor having a plurality of blades;
an engine;
rotor drive means including an overrunning clutch for connecting said main rotor to said engine whenever the speed of said main rotor does not exceed the speed of said engine;
pilot operated yaw controls for providing a yaw command signal indicative of the relative position of said pilot operated yaw controls said yaw command signal controlling the pitch angle of said tail rotor blades; and
means for providing a yaw command rate signal indicative of the rate of change of said yaw command signal;
engine control means for providing a fuel command signal indicative of fuel flow required for desired engine operation, and for metering fuel flow to said engine in response to said fuel command signal;
means for providing a fuel compensation signal the magnitude and duration of which are dependent upon said yaw command rate signal; and
said engine control means comprising means for combining said fuel compensation signal with said fuel command signal.

9. A helicopter according to claim 8 wherein said fuel compensation signal increases fuel flow to said engine in response to a commanded yaw maneuver in the direction of main rotor rotation, and said fuel command signal yaw component decreases fuel flow to said engine in response to a commanded yaw maneuver opposite the direction of main rotor rotation.

10. A helicopter according to claim 8 further comprising limiting means for providing a first limit 49 for limiting the magnitude of said fuel compensation signal when it is increasing fuel flow 57 to said engine, and for providing a second limit for limiting the magnitude of said fuel compensation signal when it is decreasing the fuel flow to said engine.

11. A helicopter according to claim 10 further comprising:
means for providing an engine speed signal indicative of the rate of change in engine speed 177; and
said limiting means second limit being determined as a function of said engine speed signal.

12. A helicopter according to claim 8 further comprising:
means for providing an air speed multiple as a function of helicopter airspeed; and
means for multiplying said fuel compensation signal by said airspeed multiple prior to combining said fuel compensation signal with said fuel command signal.

13. A helicopter according to claim 12 wherein said air speed multiple is set equal to zero when said helicopter airspeed is above a threshold magnitude and when said helicopter is on its landing gear.

14. A helicopter according to claim 8 wherein said engine control means further comprises means for providing an override signal for preventing the combination of said fuel compensation signal with said fuel command signal.

15. A helicopter according to claim 14 further comprising:
means for providing an engine speed signal indicative of the speed of said engine;
means for providing an engine acceleration signal indicative of the rate of change of said engine speed signal; and
said override signal being provided in response to said engine speed signal being indicative of engine speed above a threshold magnitude, said engine acceleration signal being indicative of engine acceleration above a threshold magnitude, and said fuel compensation signal adding fuel; in response to said engine speed signal being indicative of engine speed above a threshold magnitude and said engine acceleration signal being indicative of engine deceleration; or in response to said engine speed signal being indicative of engine speed below a threshold magnitude and said fuel compensation signal removing fuel.

* * * * *